O. G. LUYTIES.
AUTOMOBILE.
APPLICATION FILED APR. 15, 1912, RENEWED JUNE 12, 1918.
1,299,844.
Patented Apr. 8, 1919.
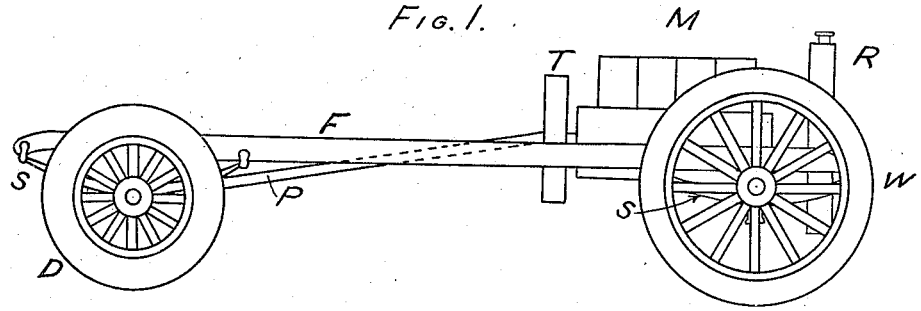
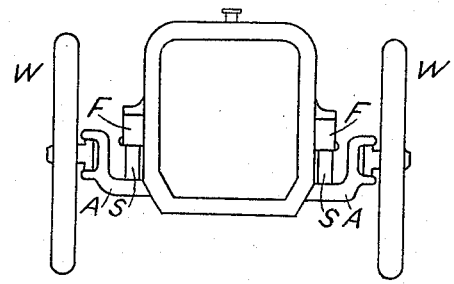
WITNESSES:
INVENTOR
Otto G. Luyties

UNITED STATES PATENT OFFICE.

OTTO G. LUYTIES, OF SHARON SPRINGS, NEW YORK.

AUTOMOBILE.

1,299,844. Specification of Letters Patent. Patented Apr. 8, 1919.

Application filed April 15, 1912, Serial No. 691,063. Renewed June 12, 1918. Serial No. 239,661.

*To all whom it may concern:*

Be it known that I, OTTO G. LUYTIES, a citizen of the United States, and a resident of Sharon Springs, in the county of Scoharie and State of New York, have invented certain new and useful Improvements in Automobiles, of which the following is a specification.

This invention relates to the mechanism of automobiles. It has for its object a combination of parts giving increased comfort and greater speed per horsepower.

Automobiles as at present constructed generally have the motor in front above two comparatively small wheels used for steering, the power being transmitted to two equally small driving wheels in the rear. In earlier types large rear driving wheels were tried. Recently some automobiles have been built with large wheels both front and rear.

It should be observed that the weight of an automobile motor is always large being with its accessories several hundred pounds. In spite of its weight it is a delicate piece of machinery, and should be properly supported to prevent injury from strains and from sudden shocks. Now large wheels form a much better rolling support than small wheels because they ride more easily over obstructions and do not sink so deeply into depressions. The inventor has found, however, that large wheels are not advisable for the rear wheels of an automobile especially when they do the driving. If the driving wheels are large they require a strong and heavy mechanism to be in proper proportion to the torque of any given horsepower. The principal trouble however arises from the side strain on the rear wheels when rounding turns, large wheels being apt to break by dishing or buckling.

By using large wheels in front fitted with rubber tires and carrying a frame upon suitable springs the inventor secures an excellent support for the motor, and by using small driving wheels in the rear he obtains the advantage of a small torque and strong compact construction. The large front wheels easily carry the motor over obstructions, and when this heavy dead weight has once passed the rest of the automobile follows readily, especially as the rear wheels have the driving torque to help them over obstructions.

In the accompanying drawing Figure 1 shows a side view of the improved mechanism, and Fig. 2 a front view of the forward part of the machine. M represents the motor with radiator R carried on the frame F supported by the springs S on the axle A of the front wheels W. The front axle is preferably made with a pronounced drop as shown, so as to have a low center of gravity for the motor.

The power is applied through the transmission T and the inclined shaft P to the driving wheels D located near the rear end of a rather long frame. The rear wheels are equipped with extra large rubber tires so as to have sufficient surface in spite of their small diameter. The front wheels as shown are about 40 inches total diameter, and the rear wheels 32 inches. A difference in size of two or three per cent. is not sufficient to show the advantages of this construction, but a difference of from ten to thirty per cent. is of pronounced benefit.

Having thus described my invention what I claim as new and desire to secure by Letters Patent is:

1. A four-wheel self-propelled vehicle comprising, in combination, a pair of rear wheels, a pair of front wheels of materially larger external diameter than said rear wheels, an engine mounted on the forward portion of the vehicle to impose the major portion of its weight on said large front wheels, means adapted to drive said rear wheels from said engine, means adapted to steer the vehicle by said front wheels, and a substantially horizontal frame mounted upon said four wheels.

2. A four-wheel self-propelled vehicle comprising, in combination, a pair of rear wheels having a substantially straight driving connection extending from hub to hub, a pair of front wheels of materially larger external diameter than said rear wheels, a front axle extending materially below the axes of said front wheels, an engine mounted on the forward portion of the vehicle to impose the majority of its weight on said large front wheels, means adapted to drive said rear wheels from said engine, and means adapted to steer the vehicle by said front wheels.

In testimony whereof I have signed my name to this specification in the presence of two subscribing witnesses.

OTTO G. LUYTIES.

Witnesses:
HENRY E. G. LUYTIES,
JAMES BARKER.

Copies of this patent may be obtained for five cents each, by addressing the "Commissioner of Patents, Washington, D. C."